C. J. CLEMENTS.
TOGGLE BOLT.
APPLICATION FILED FEB. 18, 1911.
991,427.
Patented May 2, 1911.
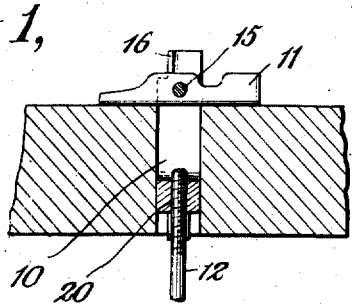
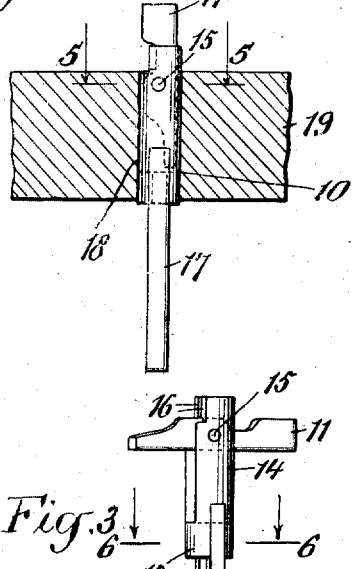
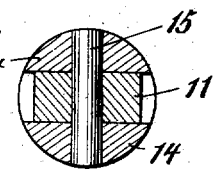
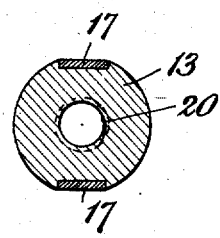
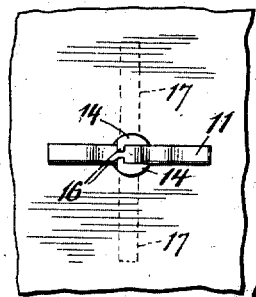
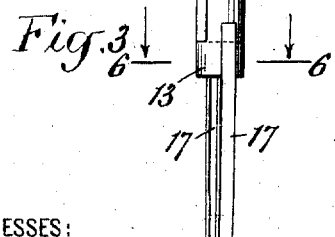
WITNESSES:
F. B. Graves
Lyman S. Andrews Jr.
INVENTOR
Charles J. Clements
BY
Chapin Raymond
his ATTORNEYS
THE NORRIS PETERS CO., WASHINGTON, D. C.

UNITED STATES PATENT OFFICE.

CHARLES J. CLEMENTS, OF BROOKLYN, NEW YORK.

TOGGLE-BOLT.

991,427. Specification of Letters Patent. Patented May 2, 1911.

Application filed February 18, 1911. Serial No. 609,341.

*To all whom it may concern:*

Be it known that I, CHARLES J. CLEMENTS, a citizen of the United States of America, and a resident of Brooklyn, county of Kings, and State of New York, have invented certain new and useful Improvements in Toggle-Bolts, of which the following is a specification, reference being had to the accompanying drawings, forming a part thereof.

My invention relates to toggle bolts and particularly to improvements therein, whereby the nut element may be inserted and retained in place independently of the bolt element, to the end that the nut element may be inserted in place before the article to be secured thereby is mounted in position, that the bolt element need be no longer than is necessary for the proper engagement thereof with the nut element to finally hold the parts together, and that the bolt may be removed and replaced at will without the danger of the nut element being lost.

This invention consists in a modification of a structure for a similar purpose disclosed in a copending application Serial No. 609,340 filed upon even date herewith, and to which reference is made for a broad disclosure of the invention, and for generic claims thereto.

The present invention consists in certain novel features of construction and combinations of parts such as will be fully pointed out hereinafter, reference being had to the accompanying drawings in which an embodiment of my invention is illustrated.

In the drawings: Figure 1 is a view in central longitudinal section through a toggle bolt constructed in accordance with my invention, showing the same as employed in use. Fig. 2 is a view in side elevation of the same showing the bolt anchor as in the act of being inserted into place. Fig. 3 is a detail view in perspective of the bolt anchor. Fig. 4 is a view in rear elevation of the anchor in use. Fig. 5 is a detail transverse sectional view of the bolt anchor upon an enlarged scale, the plane of section being upon the line 5—5 of Fig. 2. Fig. 6 is a view in transverse section through the holder element upon the plane of the line 6—6 of Fig. 3.

The toggle bolt comprises in general a holder 10, an anchor element 11 pivotally connected thereto, and a threaded bolt 12. The holder comprises a base 13 having two arms 14 uprising therefrom, and the anchor element 11 is located between the two said arms, being pivotally connected at 15 thereto near the outer extremities. The anchor element is free to swing between the said arms from a position longitudinal with respect to the holder as shown in Fig. 2, to a position transverse with respect thereto as shown in Figs. 1 and 3. The toggle element may be limited in its movement as above, the upper extremities of the arms 14 being shown as provided with inwardly projecting portions 16 for this purpose, in the construction illustrated.

In addition to the rearwardly extending arms 14 the holder is provided with forwardly extending flexible retaining elements 17, the same being in the form of narrow strips of malleable metal which are adapted to be readily bent over at right angles to the axis of the holder against the front face of the wall or other structure in which the toggle bolt is employed, after the same has been inserted into place. These extensions also afford ready means for manipulating the nut element when inserting the same in place. In Fig. 2 the same is shown as being inserted in place and it will be seen that the extensions may be grasped and the anchor element and holder thereby readily inserted through a hole 18 in a wall or similar structure 19, designed to receive it. When inserted the anchor element is adjusted in longitudinal relation with the holder and the holder is pushed in far enough for the anchor to be free to move at the rear of the structure. After the nut element has been inserted to this extent the anchor part 11 is caused to move to its position at right angles with respect to the holder, this being readily accomplished by rotating the holder to a proper position wherein the anchor part will move by gravity to this position, the portion of the anchor element upon one side of its pivotal center being heavier than at the other for this purpose. Thereafter the nut element is retracted until the anchor part is in engagement with the rear face of the structure as shown in Fig. 1. Then the retaining strips 17 are bent over against the front face of the structure and the nut element is thereby retained in position. The retaining strips are shown in dotted lines in Fig. 4 when in their bent-over position, while in Fig. 1 a portion of one of these retaining strips, such as shows beyond the sides of the bolt 12, is shown, the main portion of this extremity not appearing in this figure because as bent over it extends in a horizontal plane in a direction away from the observer.

The base 13 of the holder has a central screw-threaded opening 20 adapted to receive the threaded end of the bolt 12. The bolt may now be freely inserted and removed at will, for the nut element is held in place independently of the bolt, as will be readily seen.

The retaining elements 17 are made of very thin flexible metal, so thin that the space they occupy is negligible and they will be entirely concealed by the article attached by the use of the toggle bolt.

What I claim is:

1. In a toggle bolt, the combination with an interiorly screw-threaded holder provided with a forwardly projecting extension arranged to be bent into place after the holder has been inserted into place in use, of an anchor element pivoted to the said holder, and a screw-threaded bolt for co-engagement with the said holder.

2. In a toggle bolt, the combination with a holder having an interiorly screw-threaded base, two arms projecting rearwardly thereof, and one or more bendable retaining extensions projecting forwardly thereof, of an anchor element located between the said arms and pivoted to the extremities thereof, whereby the said element may swing from a position longitudinally with respect thereto to a position at right angles therewith, and a screw-threaded bolt for co-engagement with the threaded portion of the said holder.

CHARLES J. CLEMENTS.

Witnesses:
D. HOWARD HAYWOOD,
LYMAN S. ANDREWS, Jr.

Copies of this patent may be obtained for five cents each, by addressing the "Commissioner of Patents, Washington, D. C."